United States Patent
Giordana

(10) Patent No.: US 11,519,053 B2
(45) Date of Patent: Dec. 6, 2022

(54) METHOD FOR THE TREATMENT OF IRON-CONTAINING SLUDGE

(71) Applicant: ArcelorMittal, Luxembourg (LU)

(72) Inventor: Severine Giordana, Metz (FR)

(73) Assignee: ArcelorMittal, Luxembourg (LU)

(*) Notice: Subject to any disclaimer, the term of this patent is extended or adjusted under 35 U.S.C. 154(b) by 1058 days.

(21) Appl. No.: 15/572,077

(22) PCT Filed: May 4, 2016

(86) PCT No.: PCT/IB2016/000578
§ 371 (c)(1),
(2) Date: Nov. 6, 2017

(87) PCT Pub. No.: WO2016/178073
PCT Pub. Date: Nov. 10, 2016

(65) Prior Publication Data
US 2019/0177815 A1    Jun. 13, 2019

(30) Foreign Application Priority Data

May 5, 2015    (WO) .................. PCT/IB2015/000617

(51) Int. Cl.
*C22B 7/00*    (2006.01)
*C22B 3/00*    (2006.01)
(Continued)

(52) U.S. Cl.
CPC .............. *C22B 7/007* (2013.01); *C22B 13/00* (2013.01); *C22B 13/08* (2013.01); *C22B 19/22* (2013.01); *C22B 7/02* (2013.01); *Y02P 10/20* (2015.11)

(58) Field of Classification Search
CPC .......... C22B 13/00; C22B 13/08; C22B 19/22; C22B 7/007; C22B 7/02
See application file for complete search history.

(56) References Cited

U.S. PATENT DOCUMENTS 4,025,430 A    5/1977    Pagel
4,572,771 A    2/1986    Duyvesteyn et al.
(Continued)

FOREIGN PATENT DOCUMENTS

BE    1001781        3/1990
CN    1908207 A      2/2007
(Continued)

OTHER PUBLICATIONS

Kretzschmar, Ruben, et al. "Speciation of Zn in blast furnace sludge from former sedimentation ponds using synchrotron X-ray diffraction, fluorescence, and absorption spectroscopy." Environmental science & technology 46.22 (2012): 12381-12390. (Year: 2012).*
(Continued)

*Primary Examiner* — Nicholas A Wang
(74) *Attorney, Agent, or Firm* — Davidson, Davidson & Kappel, LLC

(57) ABSTRACT

The present invention provides a method for the treatment of sludge containing iron and between 4.5% to 12% by weight of zinc. This method includes a leaching step wherein leaching agents include hydrochloric acid and chlorate, and wherein the pH of the leachate directly resulting from this leaching step is set at a value below 1.5. A recycling method and treatment installation are also provided.

22 Claims, 2 Drawing Sheets

(51) Int. Cl.
*C22B 13/00* (2006.01)
*C22B 13/08* (2006.01)
*C22B 7/02* (2006.01)

(56) References Cited

U.S. PATENT DOCUMENTS

| | | | |
|---|---|---|---|
| 6,861,037 B1 * | 3/2005 | Leimala | C22B 3/10 |
| | | | 423/87 |
| 2008/0145289 A1 * | 6/2008 | Puvvada | C22B 3/46 |
| | | | 423/101 |
| 2009/0013829 A1 | 1/2009 | Harris et al. | |
| 2013/0149219 A1 * | 6/2013 | Lakshmanan | C22B 23/0423 |
| | | | 423/22 |
| 2017/0058378 A1 | 3/2017 | Piezabiwski et al. | |

FOREIGN PATENT DOCUMENTS

| | | |
|---|---|---|
| CN | 101619399 A | 1/2010 |
| CN | 102010994 | 4/2011 |
| CN | 103194602 A | 7/2013 |
| CN | 103695657 A | 4/2014 |
| EA | 200600691 A1 | 8/2006 |
| EP | 1042518 B1 | 2/2020 |
| JP | S5348906 | 5/1978 |
| JP | H0975891 | 3/1997 |
| JP | 2004231977 A | 8/2004 |
| JP | 2008308396 | 12/2008 |
| JP | 2017506700 | 3/2017 |
| RU | 2277597 C2 | 6/2006 |
| RU | 2404271 | 11/2010 |
| WO | WO9931285 A1 | 6/1999 |
| WO | WO2015124507 | 8/2015 |

OTHER PUBLICATIONS

International Search Report of PCT/IB2016/000578, dated Sep. 7, 2017.
Ucar et al, "Kinetics of sphalerite dissolution by sodium chlorate in hydrochloric acid", Hydrometallurgy, Elsevier Scientific Publishing CY. Amsterdam, NL, vol. 95, No. 1-2, (Jan. 1, 2009), pp. 39-43, (Apr. 22, 2008), 1, 4-6.
Claassen J O et al, "Iron precipitation from zinc-rich solutions: defining the Zincor Process", Hydrometallurgy, Elsevier Scientific Publishing CY. Amsterdam, NL, (Dec. 1, 2002), vol. 67, No. 1-3.
J F Blais et al, "Metals Precipitation from Effluents: Review", doi:10.1061/ASCE1090-025X200812:3135, (Jan. 1, 2008), URL: http://www.researchgate.net/profile/Guy_Mercier2/publication/237933558_Metals_Precipitation_from_Effluents_Review/links/546c04ab0cf2b5fc17602cbl.pdf, (retrieved Jan. 5, 2016).
Jha M K et al, "Review of hydrometallurgical recovery of zinc from industrial wastes", Resources Conservation and Recycling, Elsevier Science Publisher, Amsterdam, NL, (Aug. 1, 2001), vol. 33, No. 1.
Baltpurvins K A et al, "Effect of electrolyte composition on zinc hydroxide precipitation by lime", Water Research, Elsevier, Amsterdam, NL, (May 1, 1997), vol. 31, No. 5, pp. 973-980.
"Study on recovery of zinc from ironmaking blast furnace dust and sludge of Xinyu steel plant", Wu Xi et al., Jiangxi chemical Industry, Issue, pp. 17-19 (no translation available)—published Dec. 31, 1996, see English Abstract.

* cited by examiner

METHOD FOR THE TREATMENT OF IRON-CONTAINING SLUDGE

The invention deals with a method for the treatment of iron-containing sludge. The invention deals also with an equipment to implement such a method.

BACKGROUND

During production of pig iron, gas containing dusts are emitted and exit through the top of the blast furnace. In order to be recycled, the gases must be cleaned from these dusts. Two methods are used to perform this cleaning step, a dry cleaning using dusts catchers and/or cyclones which collect the biggest dust particles that are then directly sent to the sintering plant, and a wet cleaning, in washers, collecting the finest dust particles in water. The residue of this wet cleaning step constitutes sludge.

The average composition of this sludge is 15% to 25% by weight of iron, 30% to 50% by weight of carbon, 2% to 12% by weight of zinc and 0.5% to 2% of lead. Zinc and lead are present as PbO and ZnO oxides but also notably as ZnS sulfides, also named sphalerite, as PbS sulfides and as pure metals, Zn and Pb.

Due to their high content in zinc and lead, these sludges cannot be directly recycled in the sinter plant. Generally, sinter plants allow the recycling of by-products having content below 0.40% by weight of zinc and below 0.10% by weight of lead. It is therefore necessary to further treat such sludge to lower down their heavy metals contents.

Hydrometallurgical processes are well-known solutions to remove impurities from solids or sludge. These processes include a leaching step basically consisting in mixing the solid to be treated with a liquid containing a leaching agent such as NaOH, NH3 or H2SO4. The impurities of the solid react with the leaching agent and are transferred to the liquid. The result of the leaching step is so a mixture of a leached solid or sludge and a leaching residual liquid, named leachate.

Patent BE 1 001 781 describes a method to remove heavy metals, such as zinc and lead, from blast furnaces or oxygen converters sludges. In this method, pickling liquor resulting from the pickling of steel sheets is oxidized using a solution of $Cl_2$ in order to obtain a solution rich in $Fe^{3+}$ ions. This $Fe^{3+}$ enriched solution is then used to leach the sludge. The aim of this leaching step is to solubilize zinc and lead residues so as to remove them from the sludge. This leached solid sludge is washed and sent to the sintering plant.

This method is very complex to implement because it requires performing an additional oxidation step and it implies the recycling of pickling liquor, which is not possible in every plant. Moreover the use of $Cl_2$ in industrial conditions implies to settle drastic safety measures.

Patent EP 1 042 518 describes a method wherein a first step of leaching of sludge containing iron is performed in an acidic oxidizing solution. The leaching residual liquid obtained is submitted to a separation step on at least one ion exchanger in order to remove zinc and lead. Liquid so obtained is then oxidized by a solution of $Cl_2$ in order to convert $Fe^{2+}$ ions present in the liquid in $Fe^{3+}$ ions. This $Fe^{3+}$ enriched solution is lastly used to re-leach the sludge.

In the same way as in the process described in patent BE 1 001 781, this method is very complex and implies the use of $Cl_2$.

SUMMARY OF THE INVENTION

An object of the present invention provides a treatment method of sludge containing iron and zinc allowing to significantly reducing the content of zinc while being easy to implement. An additional object of the invention is to reduce the content of lead. Another object of the invention is to selectively remove zinc and lead so as to have a high recovery rate in iron and carbon in the treated sludge.

The present invention provides a method for the treatment of sludge containing iron and between 4.5% to 12% by weight of zinc, this method comprising a leaching step wherein leaching agents include hydrochloric acid and chlorate, and wherein the pH of the leachate directly resulting from this leaching step is set at a value strictly below 1.5.

In other embodiments, the method comprises one or several of the following features, taken in isolation or any technical feasible combination:
- the leachate has a pH comprised between 0.8 and 1.5, preferably between 0.8 and 1.2,
- the chlorate is a sodium chlorate compound.
- the leaching step is performed at a temperature between 50 and 65° C.
- the sludge initially contains more than 7% by weight of zinc.
- the sludge initially contains between 1 and 2% by weight of lead.
- at least one separation step is performed after the leaching step, in order to separate a leached sludge from a residual liquid in the leachate.
- an iron precipitation step is performed after the separation step to precipitate goethite.
- a zinc and lead precipitation step is performed after the iron precipitation step to obtain zinc and lead hydroxides.
- a single precipitation step is performed after the separation step to obtain a concentrate of zinc, lead and iron hydroxides.
- the precipitation step is made through lime addition.
- the final product is a sludge containing less than 0.40% by weight in zinc and less than 0.10% by weight in lead.
- the sludge is blast furnace sludge.

The invention also provides a recycling method wherein blast furnace sludge is treated with this treatment method and sent to a sintering plant.

The invention also provides a treatment installation for the implementation of this treatment method.

Other characteristics and advantages of the invention will appear at the reading of the following description.

BRIEF DESCRIPTION OF THE DRAWINGS

In order to illustrate the invention, trials have been performed and will be described by way of non-limitative examples, notably in reference to figures which represent.

DETAILED DESCRIPTION

Figure 1:
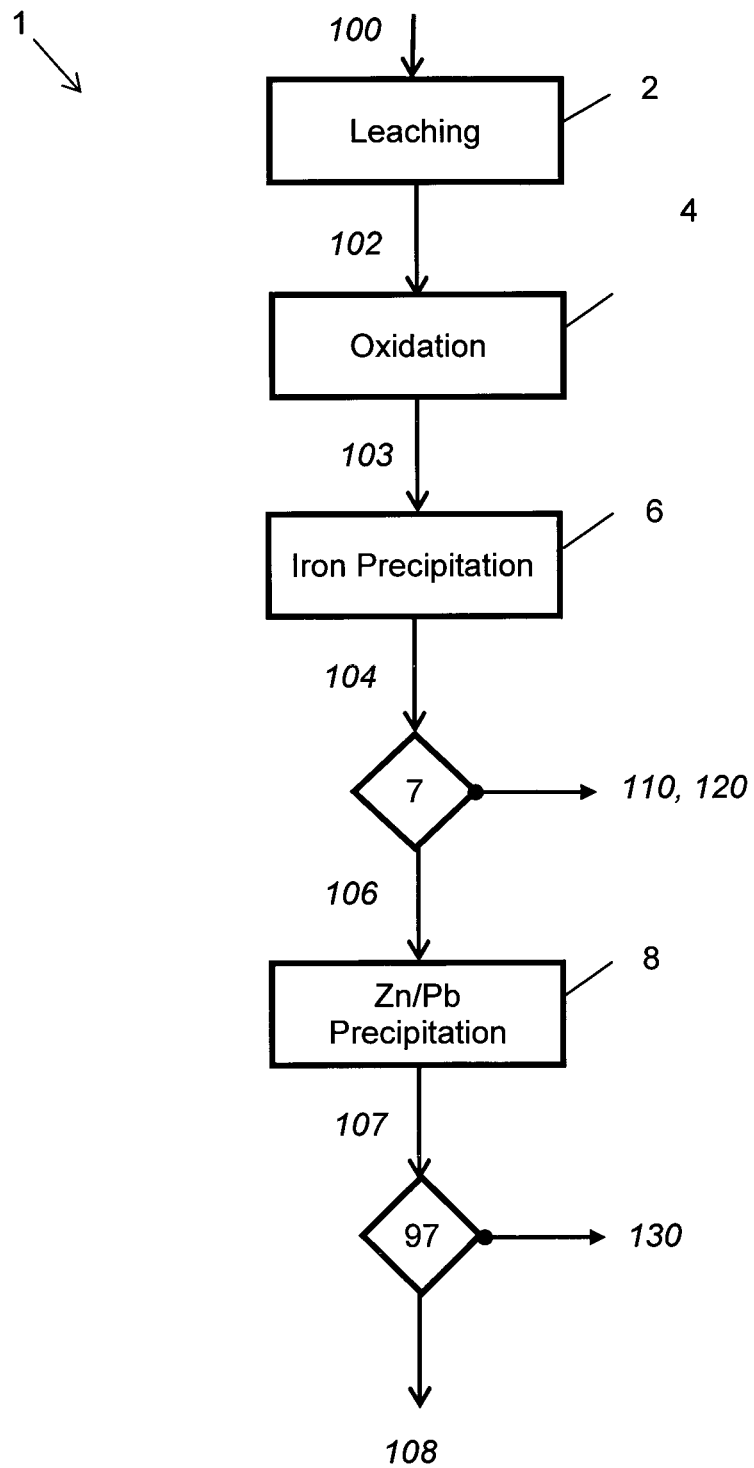
FIG. 1 is a schematic view of one embodiment of a method according to the invention.

FIG. 1 is a schematic representation of one embodiment of a treatment process 1 according to the invention.

In this process, sludge 100 containing iron and more than 4.5% by weight of zinc, such as blast furnace sludge, is treated. The invention is of particular interest to treat sludge containing more than 4.5% by weight of zinc.

As previously described, the average composition of a blast furnace sludge is between 15% and 25% by weight of iron, 30% and 50% by weight of carbon, 2% and 12% by weight of zinc and between 0.5% and 2% of lead. Zinc and lead are not only present as oxides PbO and ZnO but also notably as sulfides, ZnS, also named sphalerite and PbS and as pure metals, $Zn°$ and $Pb°$.

The blast furnace sludge 100 is submitted to a leaching step 2. The sludge 100 is placed in a leaching tank equipped with mixing devices, such as rotary helix.

Leaching agents are added into the leaching tanks. These leaching agents are a solution of hydrochloric acid and chlorates. The chlorates are brought by using an aqueous solution of $NaClO_3$ or a powder of $NaClO_3$. Chlorates could also be brought by using a solution of $KClO_3$ for example, on any aqueous solution or powder containing chlorate.

Mixing the leaching agents with the sludge produces a leachate 102, which is composed of a solid and a liquid part. The amount of leaching agents is determined so as to set the pH of the leachate 102 to a value below 1.5, preferably between 0.8 and 1.5, and more preferably between 0.8 and 1.2.

The concentration of leaching agents in the leachate 102 is comprised between 2.5 g·L$^{-1}$ and 100 g·L$^{-1}$ for HCl, and between 0.4 g·L$^{-1}$ and 10 g·L$^{-1}$ for chlorates.

The leaching tank may be equipped with heating devices so as to heat the leachate 102; preferably the temperature of the leachate is comprised between 50 and 60° C. Below 50° C., lead is less soluble and so is more difficult to dissolve. Above 60° C. the hydrochloric acid emits vapors that have to be treated.

The duration of the leaching step 2 is preferably comprised between 30 min and 2 h.

The hydrochloric acid notably reacts with zinc and lead oxides according to following reactions:

$$ZnO + 2HCl \rightarrow ZnCl_2 + H_2O$$

$$PbO + 2HCl \rightarrow PbCl_2 + H_2O$$

Zinc and lead chlorides thus produced are water soluble.

The hydrochloric acid also reacts with iron oxides according to the following reaction:

$$Fe_2O_3 + 6H^+ \rightarrow 2Fe^{3+} + 3H_2O$$

The $Fe^{3+}$ ions thus formed may react with zinc according to the following reactions:

$$Zn° + 2Fe^{3+} \rightarrow 2Fe^{2+} + Zn^{2+}$$

$$ZnS + 2Fe^{3+} \rightarrow Zn2+ + 2Fe2+ + S°$$

In the meantime following reaction may happen with chlorate ions:

$$3ZnS + ClO_3^- + 6H^+ \rightarrow 3Zn^{2+} + S° + Cl^- + 3H_2O$$

$$3PbS + ClO_3^- + 6H^+ \rightarrow 3Pb^{2+} + S° + Cl^- + 3H_2O$$

$$3Zn° + 6H^+ + ClO_3^- \rightarrow 3Zn^{2+} + Cl^- + 3H_2O$$

$$3Pb° + 6H^+ + ClO_3^- \rightarrow 3Pb^{2+} + Cl^- + 3H_2O$$

A great quantity of acid being involved in all these reactions, the pH must necessarily be set at a low value. Moreover, if the pH is above 1.5, iron ions $Fe^{3+}$ may precipitate to form goethite FeOOH. The pH must therefore be set to a value lower than 1.5, and preferably below 1.2.

Setting the pH below 0.8 is not necessary to lower down zinc content and would imply using big quantities of hydrochloric acid. Furthermore, the more acidic is the solution, the more iron will be leached, linked to the reaction between iron oxides and hydrochloric acid.

Zinc and lead present in the initial sludge 100 are turned into water soluble elements which are removed from the sludge 100 and transferred to the liquid part of the leachate 102.

The product of this leaching step 2 is a leachate 102. This leachate 102 contains notably $Fe^{2+}$, $Fe^{3+}$, $Zn^{2+}$, $Pb^{2+}$.

To recover iron, it is necessary to have this element only under the form of $Fe^{3+}$, meaning that $Fe^{2+}$ ions have to be oxidized. This oxidation step can be done by using chlorate ions:

$$6Fe^{2+} + 6H^+ + ClO_3^- \rightarrow 6Fe^{3+} + Cl^- + 3H_2O$$

It can occur through a specific oxidation step 4 as illustrated in FIG. 1, or together with the leaching step by having an initial concentration of $NaClO_3$ higher than necessary for the mere reaction with zinc and lead.

If done through a specific oxidation step 4, it includes adding an oxidizing agent such as chlorate, for example by using a solution of $NaClO_3$, to the leachate 102.

The product of this oxidation is an oxidized leachate 103 comprising notably $Fe^{3+}$, $Zn^{2+}$, $Pb^{2+}$.

To recover iron, the oxidized leachate 103 is submitted to an iron precipitation step 6. This iron precipitation step 6 may be realized by adding an alkaline component, such as lime, to the oxidized leachate 103. This addition results in an increase of pH up to a value comprised between 2 and 3, at which $Fe^{3+}$ precipitates as goethite FeOOH.

The product of this iron precipitation step 6 is a first mixture 104 composed of a solid part, the leached sludge 110 including goethite 120 and a liquid part, a residual liquid 106. Such first mixture 104 is submitted to a first separation step 7. that may be realized by any known technique of liquid/solid separation, such as decantation, flotation or filtration.

The leached sludge 110 including goethite 120 can be submitted to further washing and drying to remove chlorides. They can then be recycled to the sintering plant.

The residual liquid 106 still contains zinc and lead which can be recovered. To do so, the residual liquid 106 is submitted to a zinc and lead precipitation step 8. This zinc and lead precipitation step 8 may be realized by adding an alkaline component, such as lime, to the residual liquid 106. This addition results in an increase of the pH of the liquid, preferably until 9.5, at which zinc and lead hydroxides $Zn(OH)_2$ and $Pb(OH)_2$ precipitate.

The product of this zinc and lead precipitation step is a second mixture 107 composed of a solid part, a concentrate of zinc and lead 130, and of a liquid part, an effluent 108. Such second mixture 107 is submitted to a second separation step 9. This separation step may be realized by any known technique of liquid/solid separation, such as decantation, flotation or filtration.

The concentrate 130 of zinc and lead may be recycled to a Waelz furnace, and the effluent 108 is treated with other effluents from the steel plant.

Figure 2:
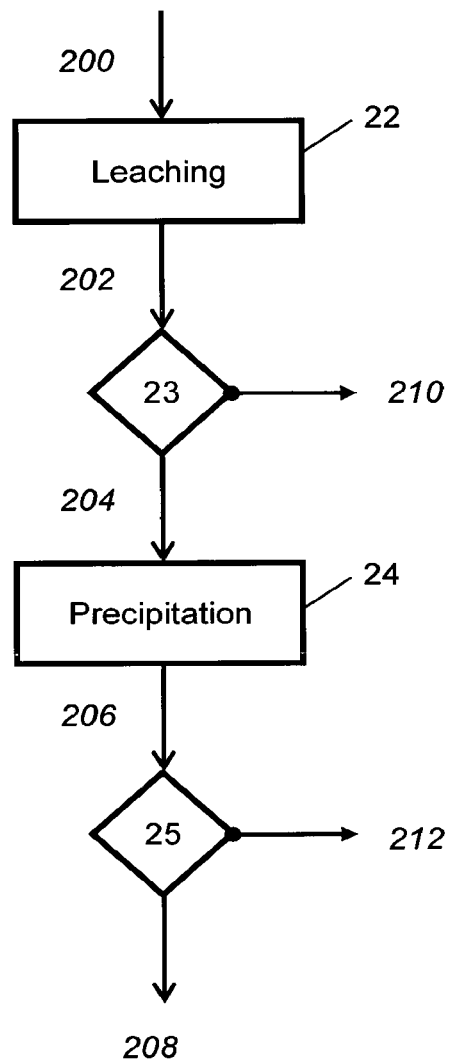
FIG. 2 is a schematic view of another embodiment of a method according to the invention

Another embodiment of the invention is illustrated in FIG. 2. In this embodiment, the treatment process 20 of a sludge 200 containing iron and more than 4.5% by weight of zinc, such as blast furnace sludge, comprises a leaching step 22, as described in the first embodiment.

The leachate 202 resulting from this leaching step 22 is composed of a solid part, the leached sludge 210, and of a liquid part, a residual liquid 203. The leachate 202 is submitted to a first separation step 23, so as to separate both parts. This separation step 23 may be realized by any known technique to separate liquid from solid, such as decantation, flotation or filtration.

The leached sludge 210 can be submitted to further washing and drying in order to remove remaining chlorides. It can then be recycled to the sintering plant.

The residual liquid 203 comprises notably $Fe^{2+}$, $Fe^{3+}$, $Zn^{2+}$ and $Pb^{2+}$. These metals need to be recovered.

To do so the residual liquid 203 is submitted to a precipitation step 24, in order to precipitate zinc, iron and lead. This precipitation step 24 may be realized by adding an alkaline component, such as lime, to the residual liquid 203.

This addition allows an increase of the pH of the liquid, preferably until 9,5, at which the three components precipitate as hydroxides.

The product of this precipitation step 24 is a mixture 204 composed of a solid part, a concentrate 220 of zinc, lead and iron, and of a liquid part, an effluent 206. The mixture 204 is submitted to a second separation step 25, so as to separate both parts. This separation step maybe realized by any known technique to separate liquid from solid, such as decantation, flotation or filtration.

In this embodiment, only one precipitation step is performed and the concentrate 220 thus obtained in a concentrate of zinc, lead and iron that may be recycled to a Waelz furnace. The effluent 206 is treated with other effluents from the steel plant.

EXAMPLES

Set of Trials 1—Use of Chlorate

Trials are performed on blast furnace sludge samples having different compositions. The initial composition (% by weight) of the different samples is gathered in table 1. This initial composition was determined using a classical method of spectroscopy with X-fluorescence. The mass percentages refer to elemental mass ratios. Indeed, elemental components of the sludge may be present under different mineral forms, such as oxides.

TABLE 1

| N° | C | Fe | Zn | Pb | Si | Ca | Al | Ti | S | Mg | P | Mn | K | Na | Cl |
|---|---|---|---|---|---|---|---|---|---|---|---|---|---|---|---|
| | | | | | | | % w | | | | | | | | |
| S1 | 39.8 | 26.1 | 4.4 | 1.1 | 2.3 | 3.1 | 1.5 | 0.1 | 1.6 | 0.5 | 0.1 | 0.1 | 0.4 | 0.2 | 0.2 |
| S2 | 39.3 | 20.1 | 11.9 | 0.9 | 2.4 | 1.6 | 1.4 | 0.1 | 2.5 | 0.3 | 0.0 | 0.1 | 0.3 | 0.1 | 0.3 |
| S3 | 40.2 | 24.8 | 6.4 | 0.9 | 2.5 | 2.6 | 0.9 | 0.1 | 1.9 | 0.5 | 0.1 | 0.1 | 0.4 | 0.3 | 0.4 |
| S4 | 45.4 | 22.8 | 5.4 | 1.1 | 2.7 | 1.8 | 1.2 | 0.1 | 2.0 | 0.5 | 0.1 | 0.1 | 0.5 | 0.3 | 0.2 |
| S5 | 51.1 | 17.2 | 64 | 0.9 | 2.7 | 2.9 | 1.4 | 0.1 | 2.2 | 0.4 | 0.1 | 0.1 | 0.9 | 0.2 | 0.6 |
| S6 | 43.6 | 21.1 | 7.5 | 0.9 | 2.7 | 1.5 | 1.2 | 0.1 | 2.5 | 0.4 | 0.1 | 0.1 | 0.5 | 0.3 | 0.3 |
| S7 | 42.3 | 21.8 | 6.8 | 1.5 | 2.4 | 2.0 | 1.3 | 0.1 | 2.5 | 0.4 | 0.0 | 0.1 | 0.3 | 0.2 | 0.3 |

Sample 1 contains less than 4.5% by weight of zinc.

Samples 1 to 3 are submitted to a leaching step using only HCl as leaching agent, without chlorate.

Samples 4 to 7 are submitted to a leaching step according to the invention, leaching agents being HCl and NaClO$_3$.

HCl used for all samples is a solution of HCl at 33% in weight.

All other conditions of the leaching steps are the same for all samples, the temperature of the leaching solution is 60° C. and the mixing speed is 300 rpm. The time of treatment is one hour. All the samples are wet sludge, with around 55% of dry sludge which represents around 100 g.

After the leaching step all samples are submitted to a filtration step in order to separate the leached sludge from the residual liquid. The leached sludge is then submitted to several washing steps and then its composition is determined using a classical method of spectroscopy with fluorescence X.

The leaching ratio is calculated according following formula:

$$\text{Leaching ratio: } \%_l(X) = \frac{(w_i(X) - w_f(X))}{w_i(X)} \times 100$$

Where: $w_i(X)$ is the weight of element $X$ in the initial sludge $w_f(X)$ is the weight of element $X$ in leached sludge These conditions and results are summed up in table 2:

TABLE 2

| Sample n° | pH | Leaching agents (g) | | Leached sludge - composition | | | | Leaching ratios | | | |
|---|---|---|---|---|---|---|---|---|---|---|---|
| | | NaClO$_3$ | HCl | % Fe | % Zn | % Pb | % C | %$_l$Fe | %$_l$Zn | %$_l$Pb | %$_l$C |
| S1 | 1.2 | 0 | 82 | 24.7 | 0.31 | 0.08 | 57.3 | 39.9 | 95.5 | 81.9 | 8.2 |
| S2 | 1.1 | 0 | 74 | 18.3 | 1.59 | 0.10 | 61.4 | 44.3 | 91.8 | 92.8 | 4.6 |
| S3 | 1.0 | 0 | 65 | 24.6 | 0.41 | 0.08 | 57.1 | 35.6 | 95.9 | 94.2 | 8.2 |

TABLE 2-continued

| Sample | Leaching agents (g) | | | Leached sludge - composition | | | | Leaching ratios | | | |
|---|---|---|---|---|---|---|---|---|---|---|---|
| n° | pH | NaClO$_3$ | HCl | % Fe | % Zn | % Pb | % C | %$_l$Fe | %$_l$Zn | %$_l$Pb | %$_l$C |
| S4 | 0.8 | 1.0 | 99 | 18.6 | 0.14 | 0.02 | 63.8 | 43.9 | 98.0 | 98.4 | 3.6 |
| S5 | 1.0 | 4.7 | 80 | 13.9 | 0.25 | 0.03 | 69.6 | 45.6 | 97.4 | 97.6 | 7.9 |
| S6 | 0.5 | 1.0 | 149 | 15 | 0.19 | 0.02 | 66.2 | 53.8 | 98.4 | 97.9 | 3.7 |
| S7 | 0.8 | 1.2 | 85 | 22.1 | 0.11 | 0.04 | 55.5 | 29.5 | 98.9 | 98.4 | 8.7 |

For sample 1, as it has a low content in zinc (inferior to 4.5% by weight), a leaching with only HCl as leaching agent is enough to reach a low content (inferior to 0.40% by weight) in zinc in the final sludge.

However, for samples 2 and 3, which contains more than 4.5% by weight of zinc, the use of HCl as only leaching agents is not sufficient; the content in zinc of the leached sludge is superior to 0.40% by weight.

For samples 4 to 7, which have been submitted to a treatment according to the invention, all final sludge have a content in zinc lower than 0.40% by weight and lower than 0.10% by weight in lead.

Set of Trials 2—pH

Trials are performed on blast furnace sludge samples with same initial composition. This initial composition (% by weight) in iron, zinc, carbon and lead is indicated in table 3. This initial composition has been determined using a classical method of spectroscopy with fluorescence X, except for the carbon content which was determined using a carbon-sulfur analyzer. The mass percentages refer to elemental mass ratios. Indeed, elemental components of the sludge may be present under different mineral forms, such as oxides.

TABLE 3

| | C | Fe | Zn | Pb | Si | Ca | Al | Ti | S | Mg | P | Mn | K | Na | Cl |
|---|---|---|---|---|---|---|---|---|---|---|---|---|---|---|---|
| % w | 39.8 | 26.1 | 4.4 | 1.1 | 2.3 | 3.1 | 1.5 | 0.1 | 1.6 | 0.5 | 0.1 | 0.1 | 0.4 | 0.2 | 0.2 |

All samples are submitted to a leaching step, the leaching agents used being HCl and NaClO$_3$. HCl used for all samples is a solution of HCl at 33% in weight.

All conditions of the leaching steps are the same for all samples, except pH. The temperature of the leachate is of 60° C. and the mixing speed is of 300 rpm. The treatment time is 2 hours. All the samples are wet sludge, with around 55% of dry sludge which represents around 80 g.

For sample S8, the pH of the leachate is of 1.5, while for the other samples it is in the range 0.8 to strictly inferior to 1.5.

After the leaching step, the samples are submitted to the same separation and washing steps as described for the set of trials 1.

The leaching ratio is calculated according following formula:

$$\text{Leaching ratio: } \%_l(X) = \frac{(w_i(X) - w_f(X))}{w_i(X)} \times 100$$

Where: $w_i(X)$ is the weight of element $X$ in the initial sludge $w_f(X)$ is the weight of element $X$ in leached sludge These conditions and results are gathered in table 4:

TABLE 4

| Sample | Leaching agents (g) | | | Leached sludge - composition (% w) | | | | Leaching ratio | | | |
|---|---|---|---|---|---|---|---|---|---|---|---|
| n° | NaClO$_3$ | HCl | pH | % Fe | % C | % Zn | % Pb | %$_l$Fe | %$_l$Zn | %$_l$Pb | %$_l$C |
| 8 | 1.86 | 59.4 | 1.5 | 28.21 | 49.50 | 0.45 | 0.08 | 22 | 92.6 | 94.7 | 10 |
| 9 | 1.86 | 82.9 | 1.33 | 26.35 | 55.15 | 0.28 | 0.04 | 33 | 95.7 | 97.9 | 8 |
| 10 | 1.86 | 91.2 | 1.18 | 24.54 | 57.15 | 0.22 | 0.03 | 40 | 96.8 | 98.2 | 8 |
| 11 | 1.86 | 98.1 | 1.11 | 23.19 | 58.85 | 0.15 | 0.02 | 44.7 | 97.9 | 98.9 | 7.8 |

The leached sludge issued from sample 8 is the only one for which the final content of zinc is too high.

The leaching ratio of carbon decreases together with the decrease of the pH. However, it implies an increase of the leaching ratio of iron. A good balance to have a good recovery rate of both carbon and iron is so to have a pH above 0.8.

The method of treatment according to the invention allows reaching a final content in zinc inferior to 0.40% by weight and in lead inferior to 0.10% by weight while having a good recovery rate of iron, upper to 50%, and of carbon, upper to 90%.

The invention claimed is:

1. A method for the treatment of sludge, the method comprising the step of
providing sludge, the sludge including iron and between 4.5% to 12% by weight of zinc;
providing leaching agents, the leaching agents consisting of hydrochloric acid and chlorate;
leaching the sludge with the leaching agents to form a leachate, a pH of leachate directly resulting from this leaching step being less than 1.5.

2. The method of claim 1, wherein the leaching agents are provided in a solution.

3. The method of claim 2, wherein the solution is a solution of hydrochloric acid and chlorates.

4. The method of claim 3, wherein the chlorates are selected from the group consisting of an aqueous solution of $NaClO_3$ a powder of $NaClO_3$, and a solution of $KClO_3$.

5. The method according to claim 1, wherein the leachate has a pH of at least 0.8.

6. A method for the treatment of sludge, the method comprising the step of
providing sludge, the sludge including iron and between 4.5% to 12% by weight of zinc;
providing leaching agents, the leaching agents consisting of hydrochloric acid and chlorate;
leaching the sludge with the leaching agents to form a leachate, a pH of leachate directly resulting from this leaching step being greater than or equal to 0.8 and less than 1.5.

7. The method according to claim 6, wherein the leachate has a pH between 0.8 and 1.2.

8. The method according to claim 6, wherein the chlorate is a sodium chlorate compound.

9. The method according to claim 6, wherein the leaching step is performed at a temperature between 50 and 65° C.

10. The method according to claim 6, wherein the sludge initially contains 7%<$Zn$≤12%, by weight.

11. The method according to claim 6, wherein the sludge initially contains between 1 and 2% by weight of lead.

12. The method according to claim 6, further comprising:
performing at least one separation step after the leaching step, in order to separate a leached sludge from a residual liquid in the leachate.

13. The method according to claim 12, further comprising:
performing an iron precipitation step after the at least one separation step to precipitate goethite.

14. The method according to claim 13, further comprising:
performing a zinc and lead precipitation step after the iron precipitation step to obtain zinc and lead hydroxides.

15. The method according to claim 13, wherein the iron precipitation step includes lime addition.

16. The method according to claim 12, further comprising:
performing a single precipitation step after the at least one separation step to obtain a concentrate of zinc, lead and iron hydroxides.

17. The method according to claim 16, wherein the single precipitation step includes lime addition.

18. The method according to claim 16, wherein the zinc and lead precipitation step includes lime addition.

19. The method according to claim 6, wherein the sludge has an initial composition comprising, with contents being expressed by weight:
15%<$Fe$<30%;
30%<$C$<60%;
1%<$Pb$≤2%;
2%<$Al_2O_3$<30%;
2%<$CaO$<5%;
0.5%<$MgO$<2%;
0.1%<$Mn$<0.2%;
0.05%<$P$<0.1%;
0.1%<$TiO_2$≤0.3%;
0.02%<$Cr_2O3$<0.08%;
0.01%<$ZrO_2$<0.05%;
0%<$V_2O_5$<0.03%;
0.05%<$Ti$≤0.2%;
22%<$Fe2O3$<38%;
0%<$V$≤0.007%;
4.5%<$Zn$<12%; and
1%<$S$<4%.

20. The method according to claim 6, wherein the sludge is blast furnace sludge.

21. A recycling method comprising the steps of:
treating blast furnace sludge with the method according to claim 6; and
sending the treated blast furnace sludge to a sintering plant.

22. A method for the treatment of sludge, the method comprising the step of
providing sludge, the sludge including iron and between 4.5% to 12% by weight of zinc;
providing leaching agents, the leaching agents consisting of hydrochloric acid and chlorate;
leaching the sludge with the leaching agents to form a leachate, a pH of leachate directly resulting from this leaching step being greater than or equal to 0.8 and less than 1.5,
wherein a final product is a sludge containing less than 0.40% by weight in zinc and less than 0.10% by weight in lead.

* * * * *